United States Patent [19]

Hanson

[11] 4,419,504
[45] Dec. 6, 1983

[54] METHOD OF ACCELERATING CURE RATES FOR ACETYLENE-TERMINATED RESINS AND CURABLE COMPOSITIONS EMPLOYED THEREIN

[75] Inventor: Harry T. Hanson, Millburn, N.J.

[73] Assignee: Celanese Corporation, New York, N.Y.

[21] Appl. No.: 366,445

[22] Filed: Apr. 7, 1982

[51] Int. Cl.³ ............................................ C08F 238/00
[52] U.S. Cl. ..................................... 526/262; 526/285
[58] Field of Search ................................ 526/262, 285

[56] References Cited

U.S. PATENT DOCUMENTS

| | | | |
|---|---|---|---|
| 3,705,131 | 12/1972 | Korshak et al. | 526/285 |
| 3,845,018 | 10/1974 | Bilow et al. | 524/233 |
| 3,882,073 | 5/1975 | Cessna | 524/258 |
| 3,904,574 | 9/1975 | Cessna | 524/258 |
| 3,926,897 | 12/1975 | Cessna | 252/522 R |
| 4,026,859 | 5/1977 | Cessna | 524/66 |
| 4,026,860 | 5/1977 | Cessna | 524/139 |
| 4,026,861 | 5/1977 | Cessna | 524/170 |
| 4,097,460 | 6/1978 | Jabloner | 524/108 |
| 4,098,767 | 7/1978 | Bilow | 526/285 |
| 4,100,138 | 7/1978 | Bilow et al. | 526/262 |
| 4,108,926 | 8/1978 | Arnold et al. | 526/285 |
| 4,131,625 | 12/1978 | Arnold | 428/367 |

OTHER PUBLICATIONS

Hergenrother, "Acetylene-Containing Precursor Polymers", Journal of Macro-molecular Science-Reviews in Macro-molecular Chemistry, C19 (1), 1, (1980).

*Primary Examiner*—Joseph L. Schofer
*Assistant Examiner*—Bernard Lipman
*Attorney, Agent, or Firm*—Burns, Doane, Swecker & Mathis

[57] ABSTRACT

Accelerated curing rates of certain acetylene-terminated aromatic sulfones and polyimide oligomers are obtained by thermally curing the resins with an effective amount of a diethynylbiphenyl.

8 Claims, No Drawings

METHOD OF ACCELERATING CURE RATES FOR ACETYLENE-TERMINATED RESINS AND CURABLE COMPOSITIONS EMPLOYED THEREIN

BACKGROUND OF THE INVENTION

The present invention relates to certain acetylene, or ethynyl, terminated aromatic and polyaromatic resins which are useful in composite resin structures such as, for example, in aircraft assemblies, and the like. More specifically, the present invention relates to a method of accelerating the cure rate of such resins.

Thermosetting resins which are ethynyl-terminated and which possess a polyaromatic polyimide internal structure are described, for example, in U.S. Pat. Nos. 4,098,767 and 4,100,138. As indicated in those patents, cured resins of this structure are useful in composite materials in aerospace and aircraft structures where high strength, lightweight materials capable of withstanding high temperatures are required. Other work known to those familiar with this art has been performed attempting to optimize the use of ethynyl-terminated aromatic polyimide oligomers.

Analogously, considerable work has been done with aromatic polysulfone resins which are ethynyl-terminated. For example U.S. Pat. Nos. 4,108,926 and 4,131,625 disclose that certain bis-ethynyl aromatic diphenyl-sulfones are effective reactive plasticizers for polysulfone thermoplastic resins, and are themselves useful as high temperature matrix resins.

SUMMARY OF THE INVENTION

The present invention is based on the unexpected and surprising discovery that diethynylbiphenyl is capable of accelerating the thermal cure of bis-ethynyl, or acetylene, terminated resins selected from the group consisting of polyimide oligomers having the structure:

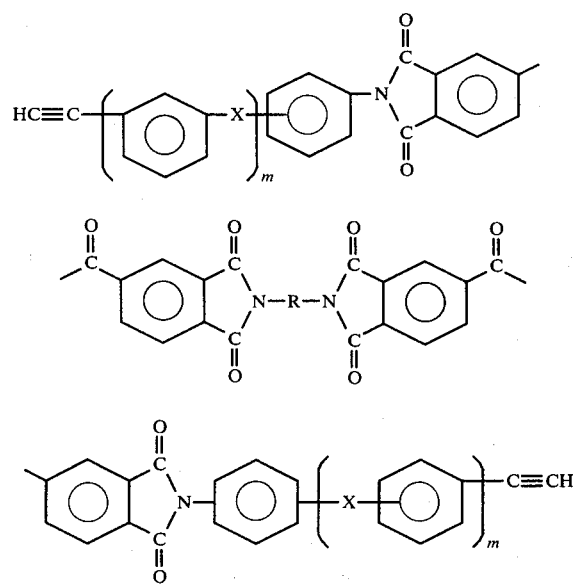

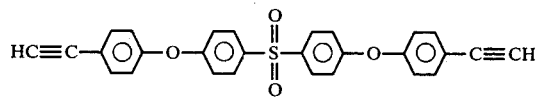

wherein $n = 0$ to 5, $m = 0$ to 5, and X is O, S, $CH_2$, CO or $SO_2$; or aromatic sulfones having the structure:

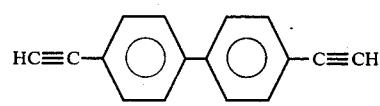

wherein at least some of the aromatic rings in said sulfones may optionally include substitution of at least some of the hydrogen atoms present thereon by a substituent selected from the group consisting of an alkyl group of 1 to 4 carbon atoms, an alkoxy group of 1 to 4 carbon atoms, a halogen and mixtures thereof.

DESCRIPTION OF THE INVENTION

The accelerant for the ethynyl-terminated resins disclosed herein is a diethynylbiphenyl. The diethynylbiphenyl accelerators of the present invention have the following structure:

$$HC{\equiv}C{-}\phantom{}{\bigcirc}{-}{\bigcirc}{-}C{\equiv}CH$$

wherein at least some of the aromatic rings in said diethynylbiphenyl may optionally include substitution of at least some of the hydrogen atoms present thereon by a substituent selected from the group consisting of an alkyl group of 1 to 4 carbon atoms, and an alkoxy group of 1 to 4 carbon atoms and mixtures thereof. A preferred accelerator is 4,4'-diethynylbiphenyl.

Such compounds are known plasticizers as evidenced by the disclosures of U.S. Pat. Nos. 3,882,073; 3,904,574; 3,926,987; 4,026,859; 4,026,860; 4,026,861; 4,097,460; 4,098,767; and 4,100,138. However, the known plasticizing ability of diethynylbiphenyl would not have enabled one of ordinary skill in the art to predict the unexpected and surprising benefits regarding the acceleration of the curing rate which can be achieved by use of the compounds of the present invention with certain resins. For example, a closely related compound, diethynylbiphenyl ether provides a significantly lower accelerative effect on ethynyl-terminated aromatic sulfones. Such a result is indeed surprising in view of the fact that the melting point of 4,4'-diethynylbiphenyl is 172° C. while the melting point of 4,4'-diethynylbiphenyl ether is 70° C., with it being recognized that the plasticizing ability of lower melting compounds is generally greater than the plasticizing ability of higher melting compounds. However, the alleged greater plasticizing ability of the lower melting diethynylbiphenyl ether does not translate into a similar increase in cure rate accelerating ability. To the contrary, the curing rate accelerating effect of the diethynylbiphenyl ether is significantly less than the curing rate increase achieved by the use of the diethynylbiphenyl with respect to certain acetylene-terminated resins. Such acetylene-terminated resins include polyimide oligomers depicted by the formula:

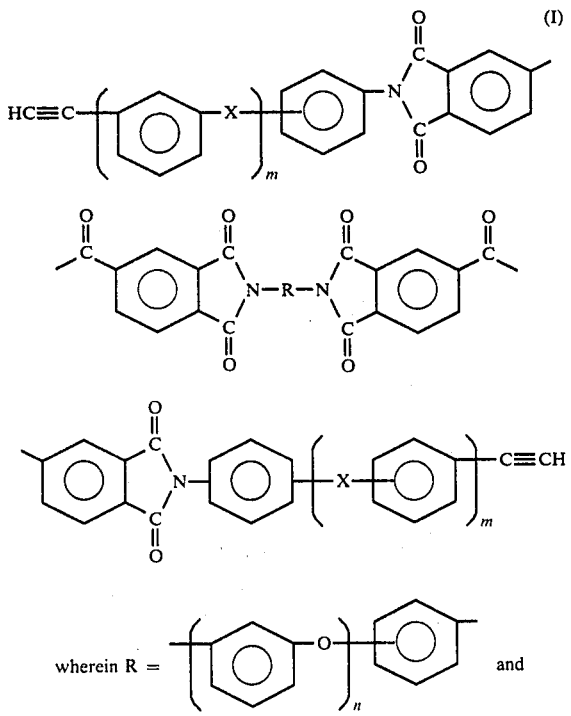

wherein n=0 to 5, m=0 to 5, and X=O, S, CH$_2$, CO or SO$_2$; and aromatic sulfones depicted by the formula:

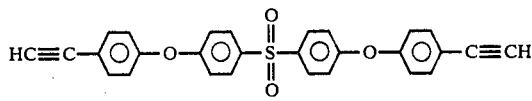

wherein at least some of the aromatic rings in said sulfones may optionally include substitution of at least some of the hydrogen atoms present thereon by a substituent selected from the group consisting of an alkyl group of 1 to 4 carbon atoms, an alkoxy group of 1 to 4 carbon atoms, a halogen and mixtures thereof.

The bis(ethynyl-phenoxy) diphenyl sulfones which may be rapidly cured in accordance with the method of the present invention may be prepared by any suitable method known in the art. For example, 4,4'-bis(3-ethynyl-phenoxy) diphenyl sulfone may be prepared as described in U.S. Pat. No. 4,131,625, herein incorporated by reference. It is not critical in which position the substituents to the ethynyl group occur (e.g., para or meta.

The ethynylated polyimide oligomers which may be cured in an unexpectedly rapid fashion in accordance with the method of the present invention are, in many cases, commercially available from, for example, the Hughes Aircraft Co., and are described in U.S. Pat. Nos. 3,845,018; 4,098,767; and 4,100,138, among others. These materials cure through addition rather than condensation in an attempt to produce void-free composite structures and retain good thermal resistant properties. Particularly impressive results in terms of the acceleration of cure are observed when using an oligomer of formula I above, wherein m=0 and n=2. A resin of this structure is commercially available from Hughes Aircraft Co. under the tradename Thermid ® HR 600.

The exact amount of the accelerant which is added to the resin to enhance the cure rate is not critical. Even a small amount of the accelerant will increase the cure rate of the resin to a certain extent. However, particularly successful results are obtained where the weight ratio of the accelerant to resin is in excess of about 5/95, preferably in excess of about 10/90. In general, the weight ratio of accelerant to resin will not exceed about 50/50.

The accelerative cure rate effect of the accelerant can be observed by use of a DuPont Differential Scanning Calorimeter (DSC) under a nitrogen atomsphere. The instrument is pre-heated to the desired cure temperature, and the sample mixture placed in the chamber. The resin and accelerant, in the case of the acetylene-terminated sulfone, are dissolved in chloroform and evaporated. In the case of the polyimide oligomer, the latter is simply mixed with a diethynylbiphenyl solution and evaporated.

The accelerant/resin mixture is then placed in 10 milligram cups and placed in the DSC. After about 45 seconds, the time required for equilibrium to be achieved, the scan is begun, curves of time vs. heat flow are obtained, and straight lines drawn through the trailing edge of the cure exotherm and through the final baseline. The intersection of these lines, projected through the time axis, is taken as the time for complete cure. Any other suitable procedure for measuring the time of cure of such mixtures is acceptable and will permit the same accelerative effect to be observed.

The invention is additionally illustrated in connection with the following Examples which are to be considered as illustrative of the present invention. It should be understood, however, that the invention is not limited to the specific details of the Examples.

EXAMPLE 1

Three milligrams of 4,4'-bis(4-ethynyl phenoxy) diphenyl sulfone are placed in a Differential Scanning Calorimeter and cured at temperatures of 200° C. and 225° C., respectively. The cure times are determined to be about 8.5 minutes and 1.8 minutes, respectively.

EXAMPLE 2

Three milligrams of Thermid ® HR 600 resin obtain from Hughes Aircraft Co. are placed in the Differential Scanning Calorimeter and cured at 264° C. The cure time is determined to be about 3.3 minutes.

EXAMPLE 3

A mixture of 4,4'-diethynylbiphenyl and the sulfone of Example 1 is prepared as described above employing a weight ratio of 5/95, respectively. The mixture is placed in the DSC (total amount of about 2.4 milligrams) and cured at temperatures of 200° C. and 225° C., respectivey. Cure times are determined to be about 7.5 and 1.7 minutes, respectively.

EXAMPLE 4

The procedure of Example 3 is repeated employing a diethynylbiphenyl to resin weight ratio of 10/90. Cure times at the two temperatures are determined to be about 6.5 and 1.5 minutes, respectively.

EXAMPLE 5

The procedure of Example 3 is repeated employing a diethynylbiphenyl to resin weight ratio of 20/80. Cure times at the two temperatures are determined to be about 5.5 and 1.2, respectively.

EXAMPLE 6

A mixture of 4,4′-diethynylbiphenyl and Thermid® HR 600 in a weight ratio of 10/90 is prepared as described above and cured in the DSC at a temperature of 264° C. The cure time is determined to be about 1.7 minutes.

It is clear from a review of the above examples that the presence of diethynylbiphenyl during the curing cycle of the exemplified resins significantly lowers the cure time thereof.

EXAMPLE 7

A mixture of 4,4′-diethynyldiphenyl ether, and the sulfone of the preceding Examples is prepared by dissolving the two components in chloroform and subsequently removing the solvent by evaporation to yield a diethynylbiphenyl ether to sulfone weight ratio of 10/90. When placed in the DSC and cured as above at temperatures of 200° and 225° C., the cure times are determined to be 8.1 and 2.4 minutes, respectively. The curing rate at 225° C. exceeds the curing rate exhibited by the sulfone alone as determined in Example 1.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A method for accelerating the cure rate of a resin selected from the group consisting of ethynylated polyimide oligomers having the structure:

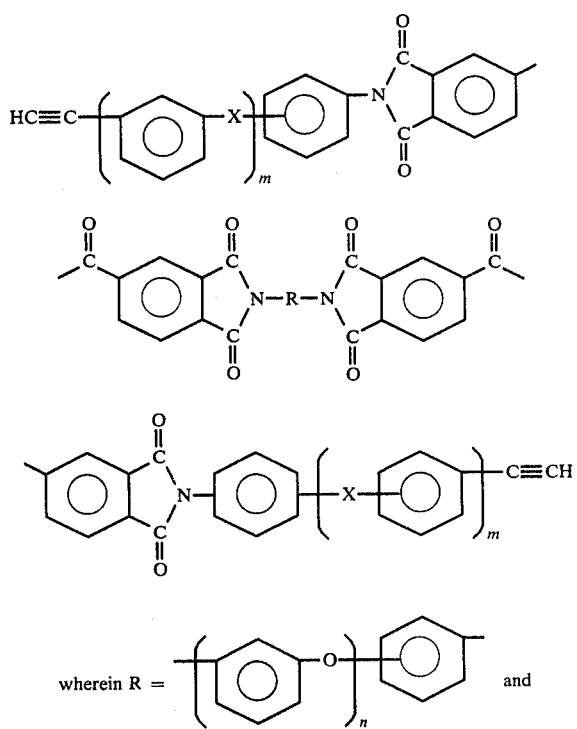

wherein R = and ethynyl-terminated aromatic sulfones having the structure:

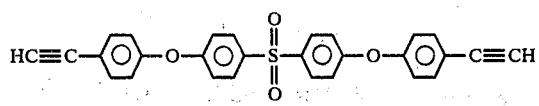

wherein at least some of the aromatic rings in said sulfones may optionally include substitution of at least some of the hydrogen atoms present thereon by a substituent selected from the group consisting of an alkyl group having from 1 to 4 carbon atoms, an alkoxy group having from 1 to 4 carbon atoms, a halogen and mixtures thereof, said method comprising thermally curing said resin in combination with an amount of a diethynylbiphenyl effective to accelerate the cure of said resin having the following structure:

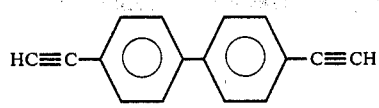

wherein at least some of the aromatic rings in said diethynylbiphenyl may optionally include substitution of at least some of the hydrogen atoms present thereon by a substituent selected from the group consisting of an alkyl group of 1 to 4 carbon atoms, an alkoxy group of 1 to 4 carbon atoms and mixtures thereof.

2. The method of claim 1 wherein the weight ratio of said diethynylbiphenyl to said resin is from about 5/95 to about 50/50.

3. The method of claim 2 wherein said resin is a polyimide oligomer wherein n=2 and m=0.

4. The method of claim 3 wherein the diethynylbiphenyl compound is 4,4′-diethynylbiphenyl.

5. A curable composition comprised of (1) a resin selected from the group consisting of ethynylated polyimide oligomers having the structure:

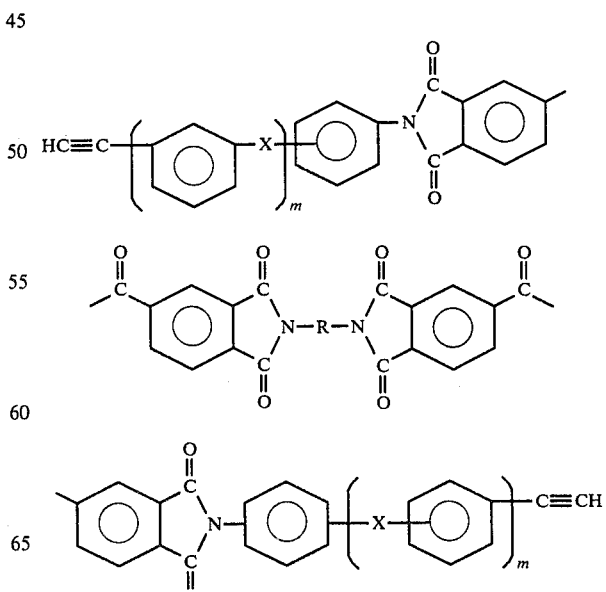

wherein R = 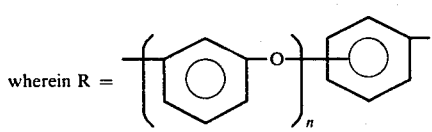 and wherein n=0 to 5, m=0 to 5 and X is 0, S, CH₂, CO, or SO₂; and ethynyl-terminated aromatic sulfones having the structure:

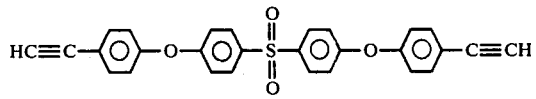

wherein at least some of the aromatic rings in said sulfones may optionally include substitution of at least some of the hydrogen atoms present thereon by a substituent selected from the group consisting of an alkyl group of 1 to 4 carbon atoms, an alkoxy group of 1 to 4 carbon atoms, a halogen and mixtures thereof and (2) a diethynylbiphenyl having the formula:

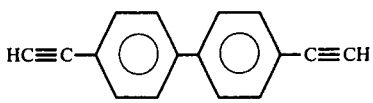

wherein at least some of the aromatic rings in said diethynylbiphenyl may optionally include substitution of at least some of the hydrogen atoms present thereon by a substituent selected from the group consisting of an alkyl group of 1 to 4 carbon atoms, an alkoxy group of 1 to 4 carbon atoms and mixtures thereof.

6. The composition of claim 5 wherein the weight ratio of said diethynylbiphenyl to said resin is from about 5/95 to about 50/50.

7. The composition of claim 6 wherein said resin is a polyimide oligomer wherein n=2 and m=0.

8. The composition of claim 7 wherein the diethynylbiphenyl compound is 4,4'-diethynylbiphenyl.

* * * * *